United States Patent [19]
Henrick et al.

[11] 4,008,258
[45] Feb. 15, 1977

[54] CYCLOPROPYL METHYL ESTERS
[75] Inventors: Clive A. Henrick; Gerardus B. Staal, both of Palo Alto, Calif.
[73] Assignee: Zoecon Corporation, Palo Alto, Calif.
[22] Filed: June 30, 1975
[21] Appl. No.: 591,689

Related U.S. Application Data
[60] Division of Ser. No. 350,708, April 13, 1973, Pat. No. 3,923,871, which is a continuation-in-part of Ser. No. 263,902, June 19, 1972, abandoned, which is a continuation-in-part of Ser. No. 255,368, May 22, 1972, abandoned.

[52] U.S. Cl. .............................. 260/410; 260/399; 260/404; 260/408
[51] Int. Cl.² ...................... C09F 5/08; C09F 7/10
[58] Field of Search ............... 260/410, 476 R, 404, 260/399, 408

[56] References Cited
UNITED STATES PATENTS 3,043,863  7/1962  Isler et al. ...................... 260/410 X
3,074,984  1/1963  Simmons ........................... 260/414

OTHER PUBLICATIONS
Kaiser et al., Jour. of Organic Chem., vol. 35, No. 4, (1970), pp. 1198–1199.

Primary Examiner—Winston A. Douglas
Assistant Examiner—John F. Niebling
Attorney, Agent, or Firm—Donald W. Erickson

[57] ABSTRACT
Organic compounds characterized by a cyclopropanemethyl moiety, synthesis thereof, and compositions thereof for the control of mites.

14 Claims, No Drawings

CYCLOPROPYL METHYL ESTERS

This is a division of Ser. No. 350,708, filed Apr. 13, 1973, now U.S. Pat. No. 3,923,871 which is a continuation-in-part of Ser. No. 263,902, filed June 19, 1972, abandoned, which is, in turn, a continuation-in-part of Ser. No. 255,368, filed May 22, 1972, abandoned.

This invention relates to novel compounds, synthesis thereof, compositions thereof and the control of mites.

The compounds of the present invention are effective for the control of spider mites. Spider mites are plant feeders and cause serious damage to orchard trees, field crops, greenhouse plants and other vegetation. They feed on the foliage or fruit of plants and trees and attack a variety of plants and trees due to their wide distribution. Mites of the family Tetranychidae, such as *Tetranychus urticae*, *Tetranychus atlanticus*, *Tetranychus bioculatus*, *Tetranychus canadensis*, *Tetranychus cinnabarinus* and *Tetranychus pacificus*, as well as *Panonychus ulmi*, *Panonychus citri*, and similar related species, are of particular biological interest and economic importance.

Compounds of the present invention of the following formula A are effective control agents for mites.

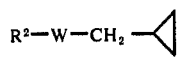
(A)

wherein,
W is —O—, —S—,

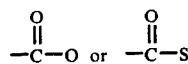

and
$R^2$ is a monovalent organic radical.

Hereinafter, each of W and $R^2$ is as defined above unless otherwise specified.

The compounds of Formula are applied to the mite at any stage, namely, during the egg, larvae, nymphal or adult stages in view of their effect in causing abnormal development leading to death, inability to pass from one stage to the next, or inability to reproduce. A compound of formula A, or mixtures thereof, can be applied at dosage levels of the order of 0.001 to 1%. Suitable carrier substances include liquid or solid inert carriers, such as water, acetone, xylene, mineral or vegetable oils, talc, vermiculite, and silica. Treatment of mites in accordance with the present invention can be accomplished by spraying, dusting, or otherwise contacting the mites and/or their eggs or larvae directly or indirectly. Generally, a concentration of less then 25% of active compound is employed, although a higher concentration of the active compound can be used depending on the type of application apparatus. The formulations can include emulsifying agents and wetting agents to assist in the application and effectiveness of the active ingredient.

Included with the compounds of formula A are:
Carboxylic Esters of formula I (W is

)

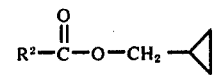
(I)

Thiol Esters of formula II (W is

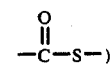)

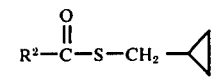
(II)

Ethers of formula III (W is —O—)

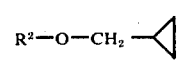
(III)

Thioethers of formula IV (W is —S—)

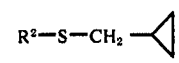
(IV)

Typical esters and thiol esters of formulae I and II are those wherein $R^2$ is alkyl of 10 to 22 carbon atoms, optionally substituted by, for example, one to two alkoxy groups of one to four carbon atoms; alkenyl of 10 to 22 carbon atoms, optionally substituted by, for example, one to two alkoxy groups of one to four carbon atoms; alkynyl of 10 to 22 carbon atoms, optionally substituted by, for example, one to two alkoxy groups of one to four carbon atoms; aryl, optionally substituted by, for example, one or two alkoxy groups; or

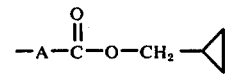

wherein A is alkylene of one to 20 carbon atoms, alkenylene or two to twenty carbon atoms, or alkynylene of two to 20 carbon atoms.

Preferred compounds of formulae I having particularly good activity for the control of mites are those compounds where $R^2$ contains from 11 to 18 carbon atoms optionally substituted by, for example, one to two alkoxy groups of one to four carbon atoms or A contains two to 12 carbon atoms.

Typical ethers and thioethers of formulae III and IV are those wherein $R^2$ is alkyl of 10 to 22 carbon atoms or

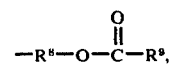

wherein $R^8$ is alkynlene of one to four carbon atoms, and $R^9$ is alkyl of one to 10 carbon atoms.

Preferred compounds of formulae III and IV having particularly good activity for the control of mites are those compounds where $R^2$ is

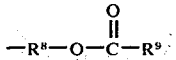

and the total number of carbon atoms in the groups R⁸ and R⁹ is between 10 and 14.

The carboxylic esters of formula I are prepared by the reaction of an acid halide, such as the acid chloride, of the formula R²—COX (X is bromo or chloro) with cyclopropylmethyl alcohol neat or in an organic solvent inert to the reaction, such as a hydrocarbon or ether solvent. Usually and excess of the alcohol is employed and the reaction proceeds at room temperature satisfactorily, although higher or lower temperatures may be used.

The thiolesters of formula II can be prepared by the reaction of an acid halide (R²—COX) with cyclopropylmethyl mercaptan in an organic solvent inert to the reaction and usually in the presence of pyridine. Alternatively, the thiolesters may be prepared by the reaction of a thiol acid of the formula R²—COSH with a halide of the formula

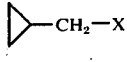

in an orgnic solvent inert to the reaction and in the presence of a base, for example, an alkali metal alkoxide or the like. Pyridine can be added, if desired.

The ethers of formula III can be prepared by the reaction of a halide of the formula

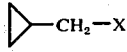

with an alkali metal or alkaline earth metal salt of the alcohol R²—OH in an organic solvent inert to the reaction. Alternatively, there may be prepared a salt of cyclopropylmethyl alcohol in situ, which is reacted with a halide of the formula R²—X in an organic solvent inert to the reaction.

Similarly, the thioethers of formula IV can be prepared by the reaction of a mercaptan of the formula R²—SH with a halide of the formula

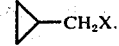

This reaction is carried out in the presence of base, such as an alkali metal salt, e.g., sodium hydroxide, sodium hydride or sodium alkoxide in a solvent inert to the reaction. Alternatively, a halide of the formula R²—X is reacted with an alkali metal salt of cyclopropylmethyl mercaptan in an organic solvent.

Cyclopropylmethyl alcohol can be prepared as described by Sarel and Newman, *J. Am. Chem. Soc.* 78, 5416 (1956); Sneen et al, ibid, 83, 4843 (1961); Siegel and Bergstron, ibid., 72, 3815 (1950) and 74, 145 (1952); U.S. Pat. Nos. 2,294,084 and 3,074,984; and reference cited therein.

Suitable starting materials of the formula R²—COX are prepared by treatment of the acid R²—COOH with oxalyl chloride, thionyl chloride, phosphorus tribromide or trichloride, or phosphorus pentabromide, or pentachloride, and the like. Typical of the acid starting material R²—COOH which can be employed in the practice of the present invention are: capric acid, undecanoic acid, lauric acid, tridecanoic acid, tetradecanoic acid, pentadecanoic acid, hexadecanoic acid, heptadecanoic acid, eicosanoic acid, docosanoic acid, tetracosanoic acid, malonic acid, succenic acid, glutaric acid, adipic acid, pemelic acid, suberic acid, azelaic acid, brassylic acid and farnesenoic acid. Particularly useful precursors are the higher fatty acids, i.e., a monocarboxylic acid containing an unbroken chain of at least seven carbon atoms bonded to a carboxyl. The higher fatty acid can be saturated or unsaturated and the chain straight or branched. In the case of ethers, thioethers and carbonates of the present invention, suitable precursors are derivable from the higher fatty acids, such as the C-1 halides, alcohols and mercaptans thereof.

Although in the practice of the present invention no limitation need be placed on the chain length in the case of acyclic monovalent organic radicals, the organic radical will usually have a chain length of five to 30 carbon atoms, which can be saturated or unsaturated and branched or straight chain. The radical can contain one or more hetero atoms in the chain, such as oxygen, sulfur or nitrogen. The acyclic organo radical can be substituted with one or more hetero atoms, such as hydroxy, halogen atom, alkoxy, amino or alkylthio. The organic radical R² can also be alicyclic including carbocyclic and heterocyclic radicals. The organic radical R² can also be an aryl or alkaryl group of from six to about 15 carbon atoms.

The term "alkyl", as used herein, refers to a straight or branched chain saturated aliphatic hydrocarbon group of one to thirty carbon atoms, e.g., methyl, ethyl, propyl, i-propyl, n-butyl, s-butyl, t-butyl, pentyl, hexyl, heptyl, octyl, 2-methyloctyl, nonyl, decyl, undecyl, 2-methylundecyl, 6-methylundecyl, dodecyl, pentadecyl and the like. The term "lower alkyl" refers to an alkyl group of one to six carbon atoms.

The term "alkenyl" as used herein refers to a straight or branched chain unsaturated carbon chain of two to 30 carbon atoms having one to three sites of olefinic unsaturation, e.g., vinyl, ethenylidene, 2-butenyl, 2-pentenyl, butyliden, 2,5-pentadienyl, 9-octadecenyl, 9,12-octadecadienyl, 9-hexadecenyl, 3,7-dimethylhepta-2,6-dienyl, 6-octadecenyl, 3,6,10-trimethylundeca-2,4-dienyl and the like. When modified by "lower", the alkenyl group has two to six carbon atoms.

The term "alkynyl" as used herein refers to a straight or branched chain unsaturated carbon chain of two to 22 carbon atoms having one or two sites of acetylenic unsaturation, e.g, ethynyl, propynyl, 2-butynyl, 2-decynyl, 9-octadecynyl, 2,5-dimethylheptynyl, and the like. When modified by the term lower, the alkynyl group has two to six carbon atoms.

The term "alkoxy", as used herein, refers to methoxy, ethoxy, n-propoxy, i-propoxy, n-butoxy, i-butoxy, s-butyoxy, and t-butoxy.

The term "aralkyl" as used herein refers to a monovalent hydrocarbon group in which a hydrogen atom of an alkyl group having a chain length of one to six carbon atoms is substituted by an aryl group, such as benzyl, phenethyl, methylbenzyl, naphthylmethyl and naphthylethyl containing from seven to 15 carbon atoms.

The term "aryl" as used herein refers to a monovalent aromatic hydrocarbon group containing from six to 14 carbon atoms such as phenyl, tolyl, xylyl, mesityl, naphthyl, ethylphenyl, t-butylphenyl and isopropylphenyl, nitrophenyl, chlorophenyl, methoxyphenyl, and methylthiophenyl.

The term "alkylene" refers to the bi-valent alkylene moiety, including branched-chain alkylene, of one to 20 carbon atoms.

The term "alkenylene" refers to the bi-valent alkenylene moiety, including branched-chain alkenylene, of two to 20 carbon atoms.

The term "alkynylene" refers to the bi-valent alkynylene moiety, including branch-chain alkynylene, of two to 20 carbon atoms.

The following examples are provided to illustrate the syntheses of the compounds of the present invention and the practice of the present invention. Temperature is reported in degrees Centigrade.

EXAMPLE 1

To a stirred solution of 3.01 g. of lauric acid in benzene, under nitrogen, is added 5.8 g. of oxalyl chloride. The mixture is stirred at room temperature for 2 hours and then concentrated in vacuo at 40°. To the concentrate is added fresh benzene and 3.25 g. of cyclopropylmethyl alcohol. The solution is stirred overnight at room temperature and then diluted with water. The reaction mixture is worked up by washing with water and brine, drying over calcium sulfate, concentrating the organic phase under reduced pressure and purifying by distillation to yield cyclopropylmethyl laurate (cyclopropanemethyl-n-dodecanoate), b.p. (bath) 90° at 0.005 mm.

EXAMPLE 2

Under nitrogen, to a stirred solution of 3.1 g. of 11-methoxy-3,7,11-trimethyldodec-2-enoic acid in dry benzene is added 4.6 g. of oxalyl chloride. The reaction mixture is stirred at room temperature for 2 hours. Solvent and excess oxalyl chloride is removed in vacuo and then fresh benzene added to make a solution followed by 3.0 g. of cyclopropanemethyl alcohol. The reaction mixture is stirred overnight at room temperature and then worked up as described in Example 1 to yield cyclopropanemethyl 11-methoxy-3,7,11-trimethyldodec-2-enoate, b.p. 90° (bath) at 0.001 mm.

EXAMPLE 3

To 1.56 g. of 3,7,11-trimethyldodec-2-enoic acid, under nitrogen, is added dry benzene and oxalyl chloride (2.4 g.). The mixture is stirred 2 hours and then concentrated in vacuo. To the concentrate is added fresh dry benzene and 1.6 g. of cyclopropylmethyl alcohol and the mixture stirred overnight at room temperature. The reaction is worked up by pouring into water and extracting with ether. The organic phase is washed with brine, stirred over neutral alumina (Act. III), concentrated under reduced pressure and purified by distillation to yield cyclopropylmethyl 3,7,11-trimethyldodec-2-enoate, b.p. 90° (bath) at 0.005 mm.

EXAMPLE 4

Under nitrogen, to a stirred solution of 3.42 g. of 11-methoxy-3,7,11-trimethyldodeca-2,4-dienoic acid (mostly trans, trans) in dry benzene, is added 3.5 ml. of oxalyl chloride. The reaction mixture is stirred for 2 hours at room temperature and then solvent and any excess oxalyl chloride are removed in vacuo. Then about 130 ml. of fresh dry benzene is added followed by 4.46 of cyclopropylmethyl alcohol and the reaction mixture stirred, under nitrogen, overnight. The reaction is worked up by pouring into water, washing with brine, drying over calcium sulfate, removing solvent in vacuo and stirring the concentrate in pentane with neutral alumina. Pentane is removed to yield cyclopropylmethyl-11-methoxy-3,7,11-trimethyldodeca-2,4-dienoate which is purified by distillation to give a product having a boiling point of 90° (bath) at 0.01 mm.

EXAMPLE 5

Palmitoyl chloride (3.3 g.) is dissolved in about 100 ml. of dry benzene, under nitrogen, and then 2.9 ml. of cyclproplmethyl alcohol is added. The reaction mixture is stirred overnight at room temperature, under nitrogen. The reaction is poured into distilled water, washed with water and brine, dried over calcium sulfate and solvent removed to yield cyclopropylmethyl palmitate b.p. 110° (bath) at 0.01 mm. (solid and liquid with the liquid solidifying upon standing at room temperature) which can be purified by chromatography.

EXAMPLE 6

To a solution of 3.05 g. of trans-cinnamic acid in dry benzene is added 5 ml. of oxalyl chloride. The reaction mixture is stirred at room temperature, under nitrogen, for 2 hours. Solvent is removed in vacuo and replaced by fresh dry benzene and 3.9 ml. of cyclopropylmethyl alcohol is added. The reaction mixture is stirred overnight at room temperature, under nitrogen. The reaction is worked up by washing with water and brine, drying over calcium sulfate and evaporating under reduced pressure and fractionally distilling to yield the cyclopropylmethyl ester of trans-cinnamic acid, b.p. 100° (bath) at .1 mm.

The process of this Example is repeated preparing the cyclopropylmethyl ester of cumic acid by using 0.02 mole of cumic acid, 0.06 mole of oxalyl chloride and 0.04 mole of cyclopropylmethyl alcohol in dry benzene.

EXAMPLE 7

The acid chloride of each of stearic acid, myristic acid, undecanoic acid, tridecanoic acid, margaric acid, pentadecanoic acid, arachidic acid, tricosanoic acid, behenic acid and heneicosanoic acid is prepared by reaction with oxalyl chloride in benzene using procedures described above and then 0.1 mole of each acid chloride is reacted with 0.25 mole of cyclopropylmethyl alcohol in benzene to yield the respective cyclopropylmethyl ester of each acid.

EXAMPLE 8

The acid chloride of 3,7,11-trimethyldodeca-2,4-dienoic acid (0.1 mole) is reacted with 0.2 mole of cyclopropylmethyl alcohol in benzene to yield cyclopropylmethyl 3,7,11-trimethyldodeca-2,4-dienoate.

EXAMPLE 9 a. To a mixture of 3.46 g. of anhydrous sodium hydrosulfide and 14 ml. dimethylformamide is added with cooling 4.0 g. of cyclopropylmethyl chloride. After standing 2 hours at room temperature, water and ether are added, the aqueous phase separated and extracted with ether, and the combined organic phases washed with brine, dried over calcium sulfate, filtered and distilled to yield cyclopropylmethyl mercaptan, boiling at 97°–98° at 1 atm.

b. To a solution of 6.0 g. of 11-methoxy-3,7,11-trimethyldodeca-2,4-dienoic acid and 125 ml. of dry benzene in a water bath is added 6 ml. of oxalyl chloride. After 1.5 hours, the reaction mixture is heated at 60° for 0.5 hour. Solvent is removed in vacuo. To the concentrate is added about 120 ml. of dry benzene and 8.0 g. of cyclopropyl methyl mercaptan prepared as in a above. The reaction mixture is stirred for 2 hours and then refluxed gently for about 12 hours. After cooling, the mixture is poured into water and ether added. The organic phase is washed with aqueous sodium bicarbonate and brine, dried over calcium sulfate and solvent evaporated under reduced pressure to yield S-(cyclopropylmethyl)11-methoxy-3,7,11-trimethyldodeca-2,4-dienthioate which can be further purified by chromatography.

By using an equivalent amount of each of dodecanoic acid, and hexadecanoic acid in the process of this Example, there is prepared S-(cyclopropylmethyl)-dodecathioate and S-(cyclopropylmethyl)hexadecathioate.

EXAMPLE 10

A solution of 0.01 mole of octadecanoic acid chloride, 0.03 mole of cylopropylmethyl mercaptan and dry benzene is stirred at room temperature for about 24 hours, under nitrogen. Ether and saturated sodium bicarbonate are added and the organic phase separated. The organic phase is washed with aqueous sodium bicarbonate, and brine, dried over calcium sulfate and solvent evaporated to yield S-(cyclopropylmethyl)-octadecathioate.

To 135 g. (1 mole) of cyclopropanemethyl bromide is added a solution of 80 g. of thiourea in 50 ml. of water and 100 ml. of ethanol. The reaction mixture is stirred and refluxed for about 2 hours. Then a solution of 60 g. of sodium hydroxide in 500 ml. of water is added and the mixture refluxed for about two hours. The reaction mixture is then concentrated under reduced pressure to remove most of the solvent. The concentrate is acidified by careful addition of ice cold hydrochloric acid and then extracted with ether. The ethereal extract is washed with water, dried over calcium sulfate and ether removed to yield cyclopropanemethyl mercaptan which can be further purified by distillation under water pump vacuum.

EXAMPLE 11

A solution of 0.1 mole of the acid chloride of azelaic acid, 0.6 mole of cyclopropanemethyl alcohol and dry benzene, under nitrogen, is stirred at room temperature for about 24 hours. The reaction is worked up, as before, to yield the cyclopropylmethyl diester of azelaic acid (B), b.p. 120° (bath) at 0.05 mm.

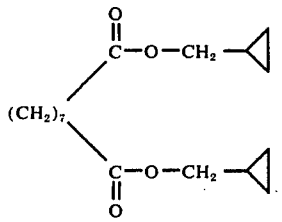

In the same way, there is prepared the cyclopropylmethyl diester of adipic acid (C), b.p. 120° (bath) at 0.1 mm.

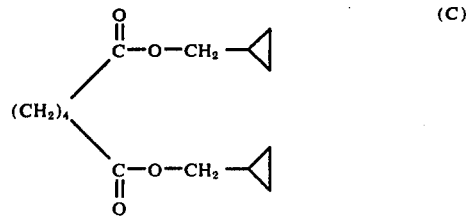

The cyclopropylmethyl diester of sebacic acid (D), b.p. 130° (bath) at 1.5 mm.

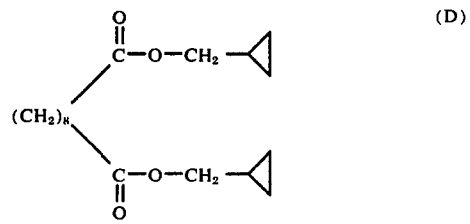

The cyclopropylmethyl diester of pimelic acid (E), b.p. 120° (bath) at 0.05 mm.

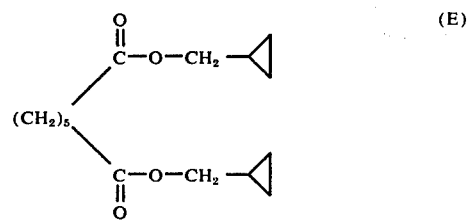

The cyclopropylmethyl diester of glutaconic acid (F), b.p. 90° (bath) at 0.1 mm.

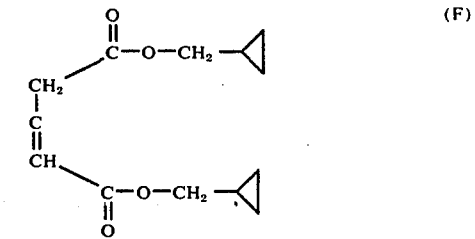

The cyclopropylmethyl diester of suberic acid (G), b.p. 130° (bath) at 1.5 mm.

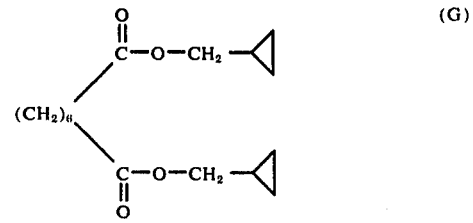

The cyclopropylmethyl diester of citraconic acid (J), b.p. 90° (bath) at 0.1 mm.

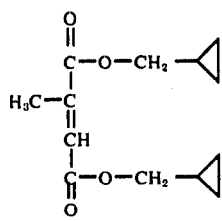

The cyclopropylmethyl diester of fumaric acid (K), b.p. 83° (bath) at 0.03 mm.

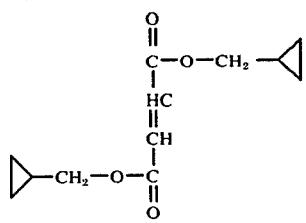

The cyclopropanemethyl diester of succinic acid (L), b.p. 78° (bath) at 0.05 mm.

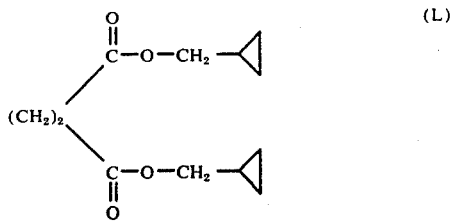

The cyclopropanemethyl diester of 1,12-dodecanedicarboxylic acid (M).

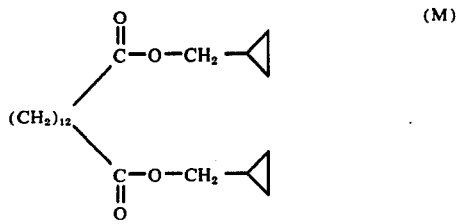

The cyclopropanemethyl diester of mesarconic acid (N).

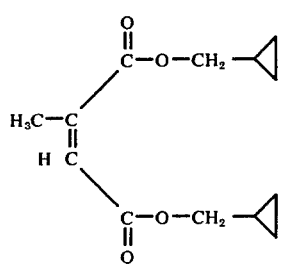

EXAMPLE 12

Following the process of Example 5, cyclopropylmethyl n-nonadecanoate is prepared using the acid chloride of n-nonadecanoic acid and cyclopropylmethyl alcohol.

EXAMPLE 13

Lauryl alcohol (0.01 mole) in diglyme is added slowly to a slurry of sodium hydride (0.01 mole) in diglyme, under nitrogen, with stirring. After addition is complete, cyclopropylmethyl bromide (0.015 mole) is added with cooling. The reaction mixture is stirred at room temperature until etherification is complete as followed by thin layer chromatography. The mixture is then poured into water and extracted with ether. The organic phase is washed with dilute sodium hydroxide, water and brine dried over calcium sulfate and solvent evaporated to yield the cyclopropylmethyl ether of lauryl alcohol which can be further purified by chromatography.

The cyclopropylmethyl ether of palmityl alcohol is prepared by the foregoing procedure.

EXAMPLE 14

A mixture of 0.02 mole of the sodium salt of cyclopropylmethyl mercaptan (prepared from sodium hydroxide and cyclopropylmethyl mercaptan) and 0.01 mole of lauryl bromide (n-dodecyl bromide) in dimethylformamide is heated at about 40°, with stirring and under nitrogen, until substantially all starting material has disappeared as followed by thin layer chromatography. The reaction is worked up by diluting with water and ether is added. The organic phase is separated, washed, dried and concentrated under reduced pressure to yield 1-(cyclopropanemethylthio)-dodecane, b.p. 102° (bath) at 0.06 mm.

Compounds such as 11-methoxy-3,7,11-trimethyl-dodeca-2,4-dienoyl chloride can be prepared as described in application Ser. No. 196,800 filed Nov. 8, 1971, U.S. Pat. No. 3,732,282 the disclosure of which is incorporated by reference. Compounds such as 3,7,11-trimethyldodeca-2,4-dienoyl chloride can be prepared as described in application Ser. NO. 187,898, filed Oct. 8, 1971, U.S. Pat. No. 3,752,843 the disclosure of which is incorporated by reference.

The effectiveness of the compounds of the present invention is demonstrated below.

TABLE 1

Adults (*Tetranychus urtical*) were allowed to oviposit for 24 hours on the underside of castor been leaf discs (1 cm.) on moist cottonwool.

After 24 hours, the adults were removed and the leaf discs were then dipped in acetone solutions of the compounds of the stated concentration.

After submersion for one second, the solvent on the leaf discs is allowed to dry and the leaf discs are then glued to a plastic petri dish to prevent crumpling.

Five days later (when all the eggs on untreated discs have emerged), the number of unhatched eggs is calculated as a percentage of the total number originally present.

The following results were obtained:

| cpd. | control | 0.01 | 0.1 | 1 | % concentration |
|------|---------|------|-----|---|-----------------|
| (1)  | 7       | 15   | 100 | 100 | % non-emergence |
| (2)  | 2       | 85   | 100 | 100 |                 |

-continued

| cpd. | control | 0.01 | 0.1 | 1 | % concentration |
|------|---------|------|-----|---|-----------------|
| (3)  | 0       | 97   | 100 | 100 | |

(1) cyclopropylmethyl 11-methoxy-3,7,11-trimethyldo-deca-2,4-dienoate (mostly trans,trans)
(2) cyclopropylmethyl-n-dodecanoate
(3) cyclopropylmethyl palmitate

TABLE II

Same procedure used as in Table I except that eggs were kept for periods of 24, 48 and 72 hours before treatment. Compound used was cyclopropanemethyl n-dodecanoate in acetone.
Results:

| eggs (age) | 0.03 | 0.1 | % concentration |
|------------|------|-----|-----------------|
| 0–24 hours | 100  | 100 | % non-emergence |
| 24–48 hours | 100 | 100 | |
| 48–72 hours | 100 | 100 | |
| 72–96 hours | 93  | 100 | |

TABLE III

Larval Evaluation On *Tetranychus urticae*

Adults were allowed to oviposit on bean leaves in the confinement of 1.5 cm. circles of tanglefoot glue (mite barrier). Adults were removed after 24 hours. All eggs hatched after 6 days after removal of the adults. Then the leaves were sprayed, until run-off, with compounds diluted in 0.1% Tween 20 in water. The mortality was evaluated 72 hours after spraying. The concentration of active compound was 0.1%.
Results:

| cpd. | % mortality | control (formulation only) |
|------|-------------|----------------------------|
| (4)  | 81          | 29                         |
| (5)  | 100         | 27                         |
| (6)  | 100         | 27                         |
| (7)  | 85          | 20                         |

(4) cyclopropylmethyl n-dodecanoate
(5) cyclopropylmethyl-11-methoxy-3,7,11-trimethyl-dodeca-2,4-dienoate
(6) cyclopropylmethyl-11-methoxy-3,7,11-trimethyl-dodec-2-enoate
(7) cyclopropylmethyl-3,7,11-trimethyldodec-2-enoate

EXAMPLE 15

Oleic acid (1.8 g.) is dissolved in about 100 ml. of dry benzene and 2.4 g. of oxalyl chloride is added with stirring, under nitrogen, at room temperature. After 2 hours, solvent is removed under reduced pressure in 30° water bath. Fresh dry benzene (100 ml.) is added and 9.4 g. of cyclopropylmethyl alcohol. The reaction mixture is stirred overnight at room temperature. The reaction is worked up by washing with water and brine, drying over calcium sulfate and evaporation of solvent to yield the cyclopropylmethyl ester of oleic acid (cyclopropylmethyloctadec-9-enoate) b.p. 120° (bath) at 0.01 mm., which can be further purified by distillation.

EXAMPLE 16

In a 500 ml. flask is stirred 3.2 g. of docosanoic acid in 250 ml. of dry benzene until most of acid dissolves. Oxalyl chloride (3.5 g.) is added and mixture stirred for 2 hours at room temperature under nitrogen. Solvent is removed in vacuo and fresh benzene added and 1.3 g. of cyclopropylmethyl alcohol. The reaction product is worked up by washing with water and brine, drying over calcium sulfate and evaporation of solvent to yield cyclopropylmethyl docosanoate m.p. 44°, which can be further purified by recrystallization from methanol.

EXAMPLE 17

Each of linoleic acid, linolenic acid, eleostearic acid, licanic acid, ricinoleic acid, palmitoleic acid, petroselenic acid, erucic acid and 9-octadecynoic acid is reacted with two equivalents of oxalyl chloride in dry benzene using procedures described above to prepare each of respective chlorides. Each of the acid chlorides is reacted with 2.5 equivalents of cyclopropanemethyl alcohol to prepare the respective cyclopropanemethyl ester, that is
cyclopropanemethyl ester of linoleic acid,
cyclopropanemethyl ester of linolenic acid,
cyclopropanemethyl ester of eleostearic acid,
cyclopropanemethyl ester of licanic acid,
cyclopropanemethyl ester of ricinoleic acid,
cyclopropanemethyl ester of palmitoleic acid,
cyclopropanemethyl ester of petroselenic acid,
cyclopropanemethyl ester of erucic acid,
cyclopropanemethyl ester of 9-octadecynoic acid.

TABLE IV

Discs were cut out of peach tree leaves having a heavy infestation of eggs of the European red spider mite (*Panonychus ulmi*). The eggs were of random age. Each disc was dipped into an acetone solution having a concentration of the compound indicated below. The discs were allowed to dry and then after 7 days the number of emerged and non-emerged eggs were counted and the percentage of non-emerged eggs were counted and the percentage of non-emergence calculated. In the control, discs dipped in acetone only, the percent of non-emergence was one percent. The following results were obtained:

| cpd. | 0.01 | 0.1 | 1.0 | % concentration |
|------|------|-----|-----|-----------------|
| (8)  | 96   | 100 | 99  | % non-emergence |
| (9)  | 61   | 100 | —   | |
| (10) | 56   | 80  | —   | |

(8) cyclopropanemethyl laurate
(9) cyclopropanemethyl palimitate
(10) cyclopropanemethyl oleate

TABLE V

A water emulsion of each of compounds (4) and (5) was prepared as described in Table 3 containing 0.1% concentration of the compound. Branches of a peach tree heavily infested with *Panonychus ulmi* were sprayed until run-off with each emulsion and emulsion containing no active ingredient. Leaf samples were collected 12 days later and showed the following counts or live mites (larvae, nymphs and adults).

|         | Average |
|---------|---------|
| control | 34      |
| cpd. (4) | 6.3    |
| cpd. (5) | 6.5    |

The mite control agents of the present invention can be used alone in an inert agriculturally acceptable carrier substance for the control of mites (Archnids) or can be used in mixture with insecticides and/or juvenile hormone analogs known in the art to provide a broader spectrum of activity.

What is claim is:

1. A compound of the formula:

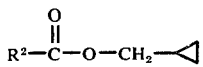

wherein, $R^2$ is alkyl of 10 to 22 carbon atoms; alkenyl of 10 to 22 carbon atoms; or alkynyl of 10 to 22 carbon atoms, said alkyl, alkenyl, or alkynyl optionally having one or two substituents selected from alkoxy of one to four carbon atoms.

2. The compounds according to claim 1 wherein $R^2$ is alkyl of 11 to 18 carbon atoms.

3. The compound cyclopropylmethyl laurate, according to claim 2.

4. The compound cyclopropylmethyl palmitate, according to claim 2.

5. The compound cyclopropylmethyl myristate, according to claim 2.

6. The compounds according to claim 1 wherein $R^2$ is alkenyl of eleven to eighteen carbon atoms substituted by alkoxy of one to four carbon atoms.

7. The compound cyclopropylmethyl-11-methoxy-3,7,11-trimethyldodec-2-enoate, according to claim 6.

8. The compound, cyclopropylmethyl oleate, according to claim 1.

9. The compound, cyclopropylmethyl 11-methoxy-3,7,11-trimethyldodeca-2,4-dienoate, according to claim 1.

10. The compound, cyclopropylmethyl 3,7,11-trimethyldodeca-2,4-dienoate, according to claim 1.

11. The compound, cyclopropylmethyl tridecanoate, according to claim 1.

12. The compound, cyclopropylmethyl n-nonadecanoate, according to claim 1.

13. The compound, cyclopropylmethyl docosanoate, according to claim 1.

14. The compound, cyclopropylmethyl 9-octadecynoate, according to claim 1.

* * * * *